June 3, 1958     HANS-JOACHIM M. FÖRSTER     2,836,962
HYDRAULIC ACTUATING SYSTEM, PARTICULARLY FOR MOTOR VEHICLES
Filed June 30, 1955
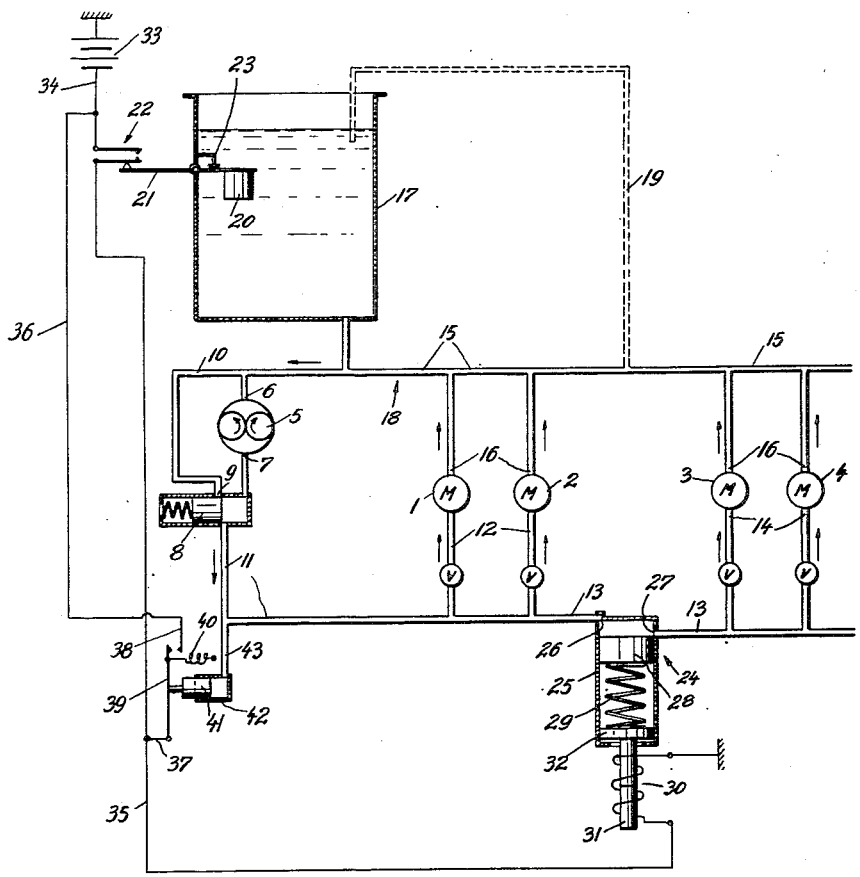
Inventor
HANS-JOACHIM M. FÖRSTER
BY Dieke and Craig
ATTORNEYS.

United States Patent Office 2,836,962
Patented June 3, 1958

2,836,962

HYDRAULIC ACTUATING SYSTEM, PARTICULARLY FOR MOTOR VEHICLES

Hans-Joachim M. Förster, Stuttgart-Bad Cannstatt, Germany, assignor to Daimler-Benz Aktiengesellschaft, Stuttgart-Unterturkheim, Germany Application June 30, 1955, Serial No. 519,139

Claims priority, application Germany July 1, 1954

8 Claims. (Cl. 60—97)

My invention relates to a hydraulic actuating system in which a pump circulates a liquid under pressure through a plurality of fluid motors arranged in parallel and serving various purposes, some of the motors having a more important function and other motors having a function of lesser importance. My invention is primarily applicable to a hydraulic actuating system of a motor vehicle including a number of servomotors supplied with the actuating liquid, for instance oil, by the pump of a common circuit.

The use of hydraulic actuating systems is quite common in various arts and lately has been adopted to an increasing extent in motor vehicles. Where a motor vehicle is equipped with a number of mechanisms requiring independent actuation, preferably a common pump is provided which is adapted to circulate fluid under pressure through a number of fluid motors arranged in parallel, each motor being coordinated to one of the various mechanisms to be actuated. As a rule, a liquid reservoir is so connected with the circuit as to keep the same filled with liquid, the latter being returned from the various fluid motors either to the reservoir or directly to the pump.

The coordination of a single pump to all of the fluid motors, however, involves the risk that should a leak develop in the system, such leak will adversely affect all of the fluid motors in the same manner. Hence, it may happen that the entire system breaks down at a time where it might still contain a supply of liquid and a liquid pressure sufficient for operation of the most important fluid motor or motors. In other words, although the functions of the servo-motors in such a system may be of different importance, a loss of liquid, for instance owing to a leak, will equally affect all of the actuating mechanisms included in the system so that under certain circumstances the entire system may break down notwithstanding the presence in the system of a quantity of liquid or a pressure which would still be sufficient for the actuation of the most important mechanism or mechanisms.

It is the object of my invention to provide a hydraulic actuating mechanism which in event of an abnormally low liquid level in the reservoir is automatically converted into a condition in which the risk of a failure of the more important fluid motors is greatly minimized. It is another object of my invention to provide an improved hydraulic actuating system of the character described including means which respond to an abnormal reduction of the fluid pressure produced by the pump and will so convert the system as to minimize the risk of a breakdown of the more important fluid motors. Alternatively, such means may respond to both an abnormally low pressure and an abnormally low liquid level in the reservoir.

Further objects of my invention will appear from a detailed description of a preferred embodiment thereof following hereinafter and the features of novelty will be pointed out in the claims. It is to be understood, however, that the terminology used hereinafter serves the purpose of illustrating the invention rather than that of limiting or restricting the same.

In the drawing a hydraulic circuit diagram of the novel hydraulic actuating system is represented.

A main group of fluid motors including motors 1 and 2 and a secondary group of fluid motors including motors 3 and 4 are supplied with a suitable liquid, such as oil, under pressure by a motor-driven pump 5 having a suction port 6 and a discharge port 7. A relief valve 8 communicates with the discharge port 7 and is adapted when the pressure produced exceeds a certain limit to short-circuit the pump by opening a port 9 connected by a return pipe 10 with the suction port 6. The main pressure line 11 connects the discharge port 7 to the inlets 12 of the main motors 1 and 2. A secondary pressure line 13 establishes a communication between the discharge port 7 and the inlets 14 of the secondary motors 3 and 4. For this purpose the secondary pressure line 13 may communicate either directly with the port 7 or with the main pressure line 11, as shown. An exhaust pipe 15 connects the outlets 16 of all of the motors to the suction port 6. The motors are selectively controlled by valves v.

A fluid reservoir 17 communicates with the suction port 6 through the intermediary of the exhaust pipe 15 to keep the system permanently filled with liquid.

Alternatively, the section of pipe 15 indicated by arrow 18 may be omitted and the liquid discharged through the motor outlets 16 may be collected in a manifold 19 and discharged into the reservoir at the top thereof as indicated by dotted lines.

The main group of fluid motors comprising the motors 1 and 2 is associated with the more important mechanisms to be actuated, such as a power steering mechanism and the hydraulic brake of an automobile, whereas the secondary group of fluid motors comprising the motors 3 and 4 is associated with mechanisms of lesser importance, such as a mechanism for automatically folding or unfolding the canvas cover of a convertible coupé or the mechanism for lifting or lowering a window. Each group may comprise any appropriate number of fluid motors. All fluid motors are arranged in parallel. The fluid reservoir is provided with means responsive to an abnormal drop of the quantity of liquid stored therein.

In the embodiment shown, such means comprises a float 20, a lever 21 operable by the float, and an electrical switch 22 operable by the lever 21. The lever 21 is a two-armed lever which is fulcrumed in the wall of the reservoir so that one arm extends into the same carrying the float 20 while the other arm extends outwardly from the reservoir beneath a pair of normally spaced spring contacts forming the switch 22. Normally, the buoyancy of the float 20 holds the lever 21 in the position shown in contact with a stop 23 mounted inside of the reservoir. When a leak should develop in the system causing the level of liquid in the reservoir to drop substantially beneath the stop 23, however, the weight of the float 20 will cause the lever 21 to rock in clockwise direction to thereby close the switch 22.

The means just described are cooperatively coordinated to a valve 24 inserted in the secondary pressure line 13 so as to close this valve when the liquid level in the reservoir drops abnormally. This has the effect of putting the secondary group of fluid motors 3, 4 out of operation. The valve 24 comprises a cylinder 25 having an inlet port 26 in its end wall and an outlet port 27 in its side wall and a piston 28 which is mounted in the cylinder for sliding movement between the open position shown and a closing position in which it covers the port 27. The secondary pressure line is composed of sections communicating with the ports 26 and 27 and, hence, will be interrupted when the valve piston 28 is moved to its closing position. Hence, it will appear that the fluid pressure produced by the pump in the main pressure line 11 acts on the upper end face of the piston 28 tending to move the valve to the open position. A helical spring 29 inserted in the cylinder 25 acts on the bottom face of the piston tending to move the same to closing position.

On the cylinder 25 there is mounted a solenoid digrammatically indicated at 30. The core 31 of the solenoid which is pulled in upward direction by energization of the same is connected with a plunger 32 of a non-magnetic material which supports the spring 26 and is slidable in the cylinder 25. Therefore, the solenoid will bias the spring 29 upon energization and will cause the spring to move the valve piston 28 positively to closing position. An electrical circuit extends from ground, which may be formed by the body of the vehicle, through a battery 33, a wire 34, the switch 22, a wire 35, the winding of solenoid 30 back to ground. Therefore, closing of switch 22 occurring upon an abnormal drop of the liquid level results in a closing of the valve 24 whereby the secondary group of fluid motors 3 and 4 will be put out of operation.

When the solenoid 30 is de-energized keeping plunger 32 in the position shown, spring 29 will nevertheless exert a certain pressure on piston 28 balancing against the pressure exerted thereon by the liquid supplied through the main pressure line 11, the piston 28 floating in its open position as shown. Should a leakage or other causes, however, reduce the pressure prevailing in the main pressure line 11 to such an extent as to endanger a safe operation of any motor of the main group 1, 2 while the level in the reservoir 17 is still high enough to keep switch 22 in open condition and solenoid 30 de-energized, the force of spring 29 will overcome the fluid pressure and move piston 28 to closing position whereby the secondary group of motors 3, 4 will be likewise put out of operation.

Hence, it will appear that I have provided means responsive to an abnormal drop of pressure produced by the pump 5, such means comprising the spring 29 acting on the valve piston 28 and operative to move the same into closing position when the force of the spring overcomes the effect of the liquid pressure on the piston 28.

If desired, however, the means responsive to an abnormal drop of pressure produced by the pump 5 may include a switch adapted to energize the solenoid 30. The switch may be arranged in shunt to switch 22 by wires 36 and 37 and may include a pair of normally spaced leaf springs 38 and 39. A helical spring 40 tends to pull contact 39 into engagement with contact 38 but is normally counteracted by a plunger 41 movable in a cylinder 42 connected by a pipe 43 to the main pressure line 11. Thus, the cylinder 42 and the plunger 41 confine a variable chamber which communicates with the discharge port 7 of the pump, and the plunger 41 constitutes a movable element confining the variable chamber. Should the pressure drop below a certain limit, the spring 40 will overcome the pressure exerted by plunger 41 on the leaf spring 39 and will close the switch formed by the two springs 38 and 39 to thereby energize the solenoid 30 thus putting the secondary group of motors out of operation.

From the foregoing description it will appear that normally the helical spring 29 exerts such a pressure on the valve piston 28 that the valve will be closed and will thus cut off the motors 3 and 4 from the supply of pressure fluid, even should the solenoid 30 be de-energized, whenever the pressure prevailing in the main pressure line 11 should drop below the limit required for safe operation of any motor of the main group. During the normal operation of the described hydraulic actuating system the reservoir 17 is kept filled with oil to a level ensuring that the switch 22 is open. The relief valve 8 is in the position shown ensuring that the prescribed normal pressure prevails in line 11. Any oil fed by the pump 5 in excess of the pressure fluid demand of the motors 1, 2, 3 and 4 is returned by the return pipe 10 to the suction port 6 of the pump 5. The normal pressure prevailing in the main pressure line 11 keeps the valve 24 in the open position shown, as the spring 29 is unable as long as the solenoid 30 is de-energized to move the piston 28 against the pressure acting on its top face into closing position. Therefore, the secondary group of motors 3, 4 is connected in parallel to the main group of motors 1, 2 with the pump 5. Should any damage occur, however, resulting in a critical drop of pressure prevailing in the main pressure line 11 or resulting in a critical drop of the liquid level in the reservoir 17, the valve 24 will be closed in the manner described putting the secondary group of motors 3, 4 out of operation.

As mentioned hereinabove, the switch 38, 39 and the pressure-responsive means for actuating the same may be omitted. Alternatively, the spring 29 may be omitted if the switch 38, 39 is provided, the plunger 32 in this event acting directly upon the valve piston 28 to close the same upon de-energization of the solenoid irrespective of the pressure produced by the pump. In either case the valve inserted in the liquid circuit will cut off the motors actuating the hydraulic mechanisms of lesser importance whenever the liquid reserve and/or the pressure produced by the pump will drop below certain limits.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Hydraulic actuating system comprising a main group of fluid motors, a secondary group of fluid motors, each motor having an inlet and an outlet, a pump having a suction port and a discharge port, a main pressure line connecting said discharge port to the inlets of said main motors, a secondary pressure line establishing a communication between said discharge port and the inlets of said secondary motors, an exhaust pipe connecting the outlets of said motors to said suction port, a fluid reservoir communicating with said suction port, means responsive to an abnormal drop of the quantity of liquid stored in said reservoir, means responsive to an abnormal drop of the pressure produced by said pump in said main pressure line, and a valve inserted in said secondary pressure line and cooperatively coordinated to said means to be closed thereby, whereby said secondary group of fluid motors will be put out of operation in response to any one of said abnormal drops.

2. Hydraulic actuating system comprising a main group of fluid motors, a secondary group of fluid motors, each motor having an inlet and an outlet, a pump having a suction port and a discharge port, a main pressure line connecting said discharge port to the inlets of said main motors, a secondary pressure line establishing communication between said discharge port and the inlets of said secondary motors, an exhaust pipe connecting the outlets of said motors to said suction port, a valve inserted in said secondary pressure line for interrupting the same, a fluid reservoir communicating with said suction port, means responsive to an abnormal drop of the quantity of liquid stored in said reservoir, means responsive to an abnormal drop of the pressure produced by said pump in said main pressure line, and an actuator controlled by at least one of said means for closing said valve, whereby said secondary group of fluid motors will be put out of operation in response to any one of said abnormal drops.

3. Hydraulic actuating system comprising a main group of fluid motors, a secondary group of fluid motors, each motor having an inlet and an outlet, a pump having a suction port and a discharge port, a main pressure line connecting said discharge port to the inlets of said main motors, a secondary pressure line establishing a communication between said discharge port and the inlets of said secondary motors, an exhaust pipe connecting the outlets of said motors to said suction port, a fluid reservoir communicating with said suction port, means responsive to an abnormal drop of the quantity of liquid stored in said reservoir, and a valve inserted in said secondary pressure line and cooperatively coordinated to said means to be closed thereby, whereby said secondary group of fluid motors will be put out of operation in response to said abnormal drop.

4. Hydraulic actuating system as claimed in claim 2 in which at least one of said means includes an electrical switch and in which said actuator is an electromagnetic device controlled by said switch.

5. Hydraulic actuating system as claimed in claim 1 in which said means responsive to an abnormal drop of the quantity of liquid stored in said reservoir includes a float, a lever operable by said float, and an electrical switch operable by said lever.

6. Hydraulic actuating system as claimed in claim 2 in which said means responsive to an abnormal drop of the pressure produced by said pump comprises a variable chamber communicating with said discharge port of said pump and including a movable element confining said chamber, a spring tending to counteract displacement of said movable element by the pressure prevailing in said chamber, and an electrical switch coordinated to and operable by said movable element.

7. Hydraulic actuating system as claimed in claim 1 in which said means responsive to an abnormal drop of pressure produced by said pump comprises a spring, said valve including a piston acted upon by said spring and by said pressure to be movable into closing position when the force of said spring overcomes the effect of said pressure on said piston.

8. Hydraulic actuating system comprising a main group of fluid motors, a secondary group of fluid motors, each motor having an inlet and an outlet, a pump having a suction port and a discharge port, a main pressure line connecting said discharge port to the inlet of said main motors, a secondary pressure line establishing a communication between said discharge port and the inlets of said secondary motors, an exhaust pipe connecting the outlets of said motors to said suction port, a liquid reservoir communicating with said suction port, a float in said reservoir, a switch operable by said float in response to an abnormal drop of the liquid level in said reservoir, a slide valve inserted in said secondary pressure line and including a slidable piston mounted for movement between a closing position and an open position, a spring acting on one end face of said piston tending to move the same into said closing position, the fluid pressure produced by said pump in said main pressure line acting on the other end face of said piston tending to move said valve to said open position, and a solenoid including a movable core, said core supporting said spring for biasing same upon energization of said solenoid causing it to move said valve to said closing position, said switch being electrically connected to said solenoid for energizing it, when responding to said abnormal drop of said liquid level.

References Cited in the file of this patent

UNITED STATES PATENTS

| | | |
|---|---|---|
| 2,370,526 | Doran | Feb. 27, 1945 |
| 2,374,588 | Doran | Apr. 24, 1945 |
| 2,634,582 | Klatte et al. | Apr. 14, 1953 |